US010958716B2

(12) United States Patent
Yamazaki

(10) Patent No.: US 10,958,716 B2
(45) Date of Patent: Mar. 23, 2021

(54) DISTRIBUTED PROCESS MANAGEMENT SYSTEM, DISTRIBUTED PROCESS MANAGEMENT METHOD FOR SUPPRESSING NUMBER OF MESSAGES BETWEEN COMPUTERS, AND INFORMATION PROCESSING APPARATUS

(71) Applicant: FUJITSU LIMITED, Kanagawa (JP)

(72) Inventor: Masanori Yamazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 55 days.

(21) Appl. No.: 16/145,335

(22) Filed: Sep. 28, 2018

(65) Prior Publication Data
US 2019/0104173 A1  Apr. 4, 2019

(30) Foreign Application Priority Data
Oct. 2, 2017 (JP) .............................. JP2017-192485

(51) Int. Cl.
G06F 15/16 (2006.01)
H04L 29/08 (2006.01)
H04L 29/06 (2006.01)
G06F 9/54 (2006.01)
H04L 12/26 (2006.01)

(52) U.S. Cl.
CPC ........... *H04L 67/1002* (2013.01); *G06F 9/54* (2013.01); *H04L 43/16* (2013.01); *H04L 67/42* (2013.01)

(58) Field of Classification Search
CPC ..... H04L 67/1002; H04L 67/42; H04L 43/16; H04L 67/10; G06F 9/54; G06F 9/505; G06F 9/4887; G06F 9/5072; G06F 11/3419

USPC ......... 709/201, 203, 224, 226; 718/102, 104
See application file for complete search history.

(56) References Cited

U.S. PATENT DOCUMENTS

| 6,618,820 B1 * | 9/2003 | Krum .................... G06Q 30/02 714/13 |
| 2002/0062157 A1 * | 5/2002 | Sugimoto ............. G06Q 10/06 700/14 |
| 2004/0226013 A1 * | 11/2004 | Mariotti ................ G06F 11/008 718/100 |
| 2011/0191777 A1 * | 8/2011 | Bansal .................... G06F 9/46 718/102 |
| 2012/0005658 A1 * | 1/2012 | Bansal ................ G06F 11/3419 717/128 |

(Continued)

FOREIGN PATENT DOCUMENTS

| JP | 8-123768 | 5/1996 |
| JP | 2009-246690 | 10/2009 |

(Continued)

*Primary Examiner* — Johnny B Aguiar
(74) *Attorney, Agent, or Firm* — Fujitsu Patent Center

(57) ABSTRACT

A distributed process management system includes an edge server configured to start and execute a process corresponding to contents of data when the data sent from a device is received; and a center server configured to manage a state of the process, wherein the edge server is configured to notify the center server of a start time and an amount of processing of the process each time the process is started, and the center server is configured to estimate an end time of the process based on the start time and the amount of processing and update the end time of the process, each time the start time and the amount of processing are notified.

12 Claims, 11 Drawing Sheets

(56) References Cited

U.S. PATENT DOCUMENTS

2013/0166712 A1 6/2013 Chandramouli et al.
2017/0017443 A1* 1/2017 Sato ..................... G06F 3/1215

FOREIGN PATENT DOCUMENTS

JP 2015-505404 2/2015
JP 2017-126238 7/2017

* cited by examiner

FIG. 4A

| PROCESS ID | THROUGHPUT | UPDATED TIME |
|---|---|---|
| 001 | 120 | 2017-06-26 11:24:00 |
| ⋮ | ⋮ | ⋮ |

| PROCESS ID | THROUGHPUT AVERAGE |
|---|---|
| AAA | 98 |
| ⋮ | ⋮ |

| PROCESS ID | PROCESS START TIME | PROCESS END TIME |
|---|---|---|
| 002 | 2017-06-26 11:32:00 | 2017-06-26 11:32:02 |
| ⋮ | ⋮ | ⋮ |

| EDGE SERVER | PROCESS ID | PROCESS ACTIVATION TIME | ESTIMATED PROCESS END TIME |
|---|---|---|---|
| GW01 | 101 | 2017-06-26 11:35:10 | 2017-06-26 11:36:13 |
| ⋮ | ⋮ | ⋮ | ⋮ |

T4

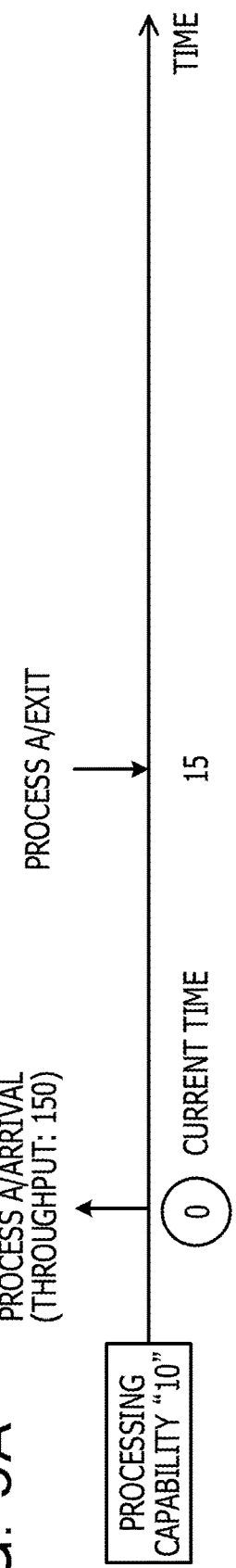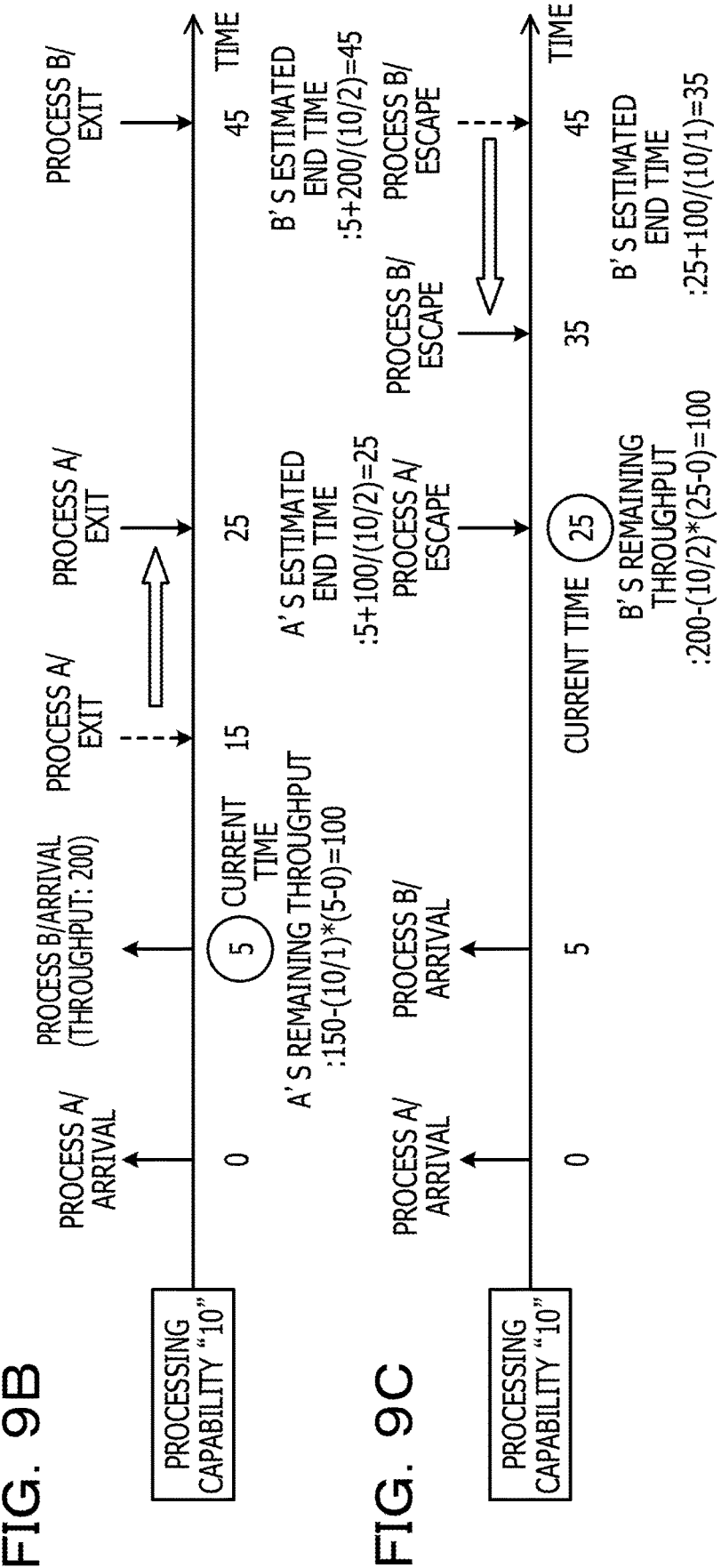
FIG. 9A FIG. 9B FIG. 9C

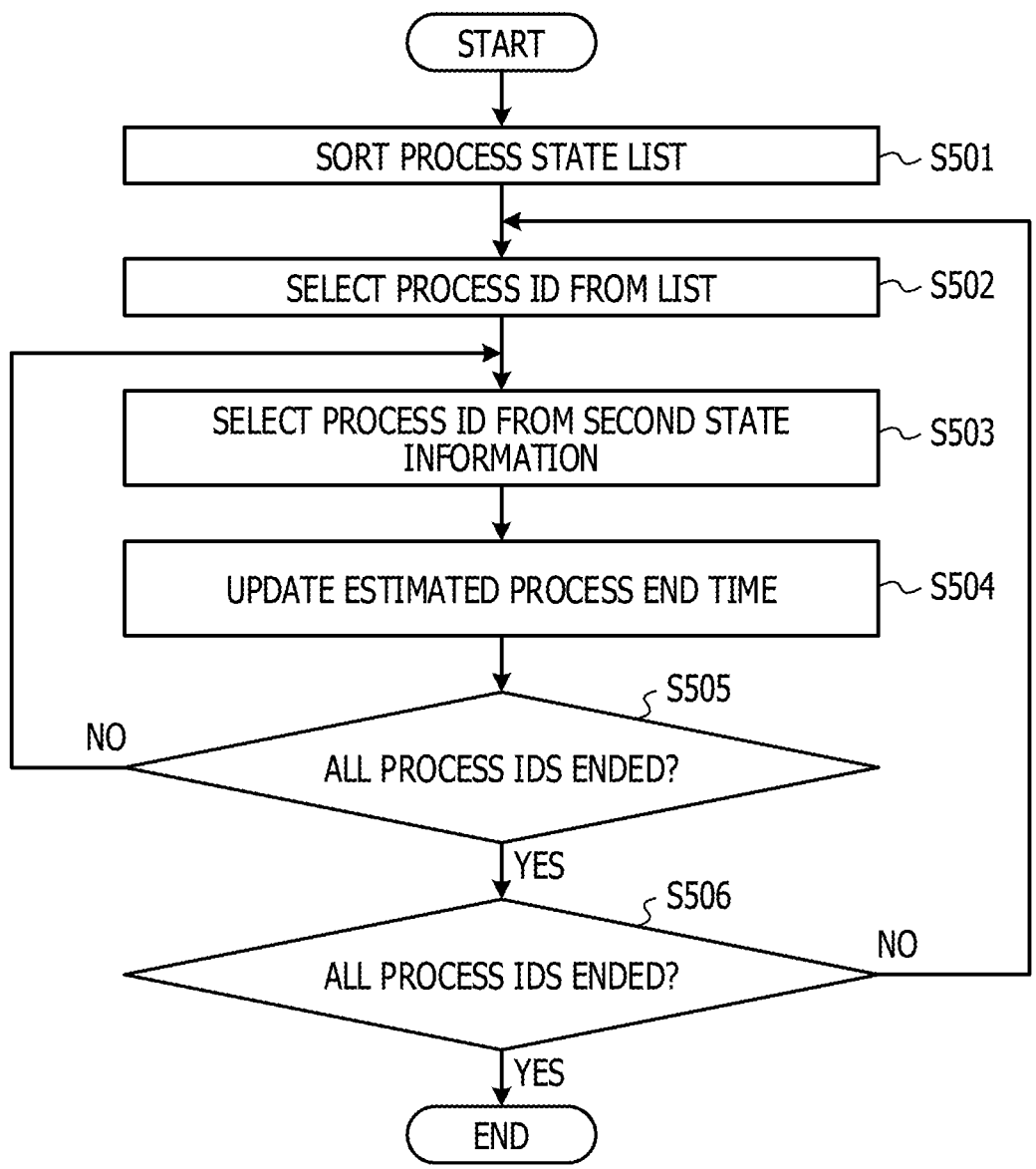

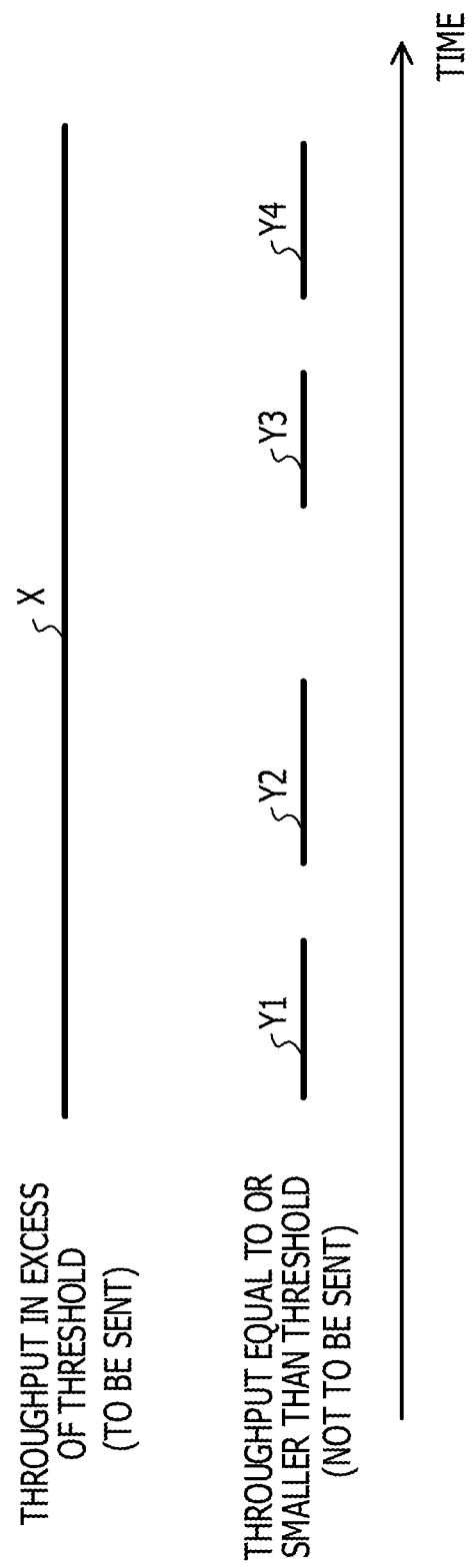

DISTRIBUTED PROCESS MANAGEMENT SYSTEM, DISTRIBUTED PROCESS MANAGEMENT METHOD FOR SUPPRESSING NUMBER OF MESSAGES BETWEEN COMPUTERS, AND INFORMATION PROCESSING APPARATUS

CROSS-REFERENCE TO RELATED APPLICATION

This application is based upon and claims the benefit of priority of the prior Japanese Patent Application No. 2017-192485, filed on Oct. 2, 2017, the entire contents of which are incorporated herein by reference.

FIELD

The embodiments discussed herein are related to a distributed process management system, a distributed process management method, and an information processing apparatus.

BACKGROUND

In a distributed system in which a management apparatus collects information related to a managed apparatus and allocates loads (tasks) to the managed apparatus, in a case where the management apparatus may not allocate loads due to a fault or other cause, there is a technology in which the managed apparatus takes charge of the management apparatus and allocates loads in place of the management apparatus (refer, for example, to Japanese Laid-open Patent Publication No. 8-123768). Further, as a manner of using a computer, there are cloud computing and edge computing, a derived form of cloud computing (refer, for example, to Japanese National Publication of International Patent Application No. 2015-505404).

Edge computing refers to a manner of usage in which another server closer to an end user (hereinafter referred to as an edge server) is provided in addition to a server equivalent to a cloud (hereinafter referred to as a center server). The edge server may distribute loads of the cloud. The edge server may suppress a delay caused by communication by performing processing for which a fast response is desirable in place of the cloud (refer, for example, to Japanese Laid-open Patent Publication No. 2017-126238).

Incidentally, the edge server described above receives data (for example, sensing data) generated and sent by end users' devices. The end users' devices are not limited to personal computers (PCs) or smartphones and may be a variety of devices such as environmental sensors, beacon terminals, automobiles, and home electric appliances in recent years. When data sent from such devices is received, the edge server starts and executes a process that corresponds to contents of the data.

However, data received by the edge server has a tendency to expand with increasing attention being paid to Internet of Things (IoT). As a result, the number of processes started by the edge server is on the increase. On the other hand, the edge server often has fewer computer resources than the center server. Therefore, it is preferable that the center server manage states (for example, process start and end times) of the processes being executed by the edge servers for each edge server so as to control the edge servers executing the processes and distribute loads between the edge servers.

In a case where the center server manages the process state, for example, the edge server may send a message indicating the process state to the center server. However, with increase in number of processes, it is likely that the number of messages sent by the edge server may increase. In consideration of the above, it is desirable to suppress the number of messages between the edge server and the center server.

SUMMARY

According to an aspect of the embodiments, a distributed process management system includes an edge server configured to start and execute a process corresponding to contents of data when the data sent from a device is received; and a center server configured to manage a state of the process, wherein the edge server is configured to notify the center server of a start time and an amount of processing of the process each time the process is started, and the center server is configured to estimate an end time of the process based on the start time and the amount of processing and update the end time of the process, each time the start time and the amount of processing are notified.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A is an example of a process information table;

FIG. 4B is an example of the amount of processing information table;

FIG. 4C is an example of a state information table;

FIG. 4D is an example of a state information table;

FIGS. 9A, 9B, and 9C are diagrams for describing estimation of a process end time;

FIG. 10 is a flowchart illustrating an example of state correction processing; and FIG. 11 is a diagram for describing an example of a message count reduction effect.

DESCRIPTION OF EMBODIMENTS

Embodiments will hereinafter be described with reference to the drawings.

Figure 1:
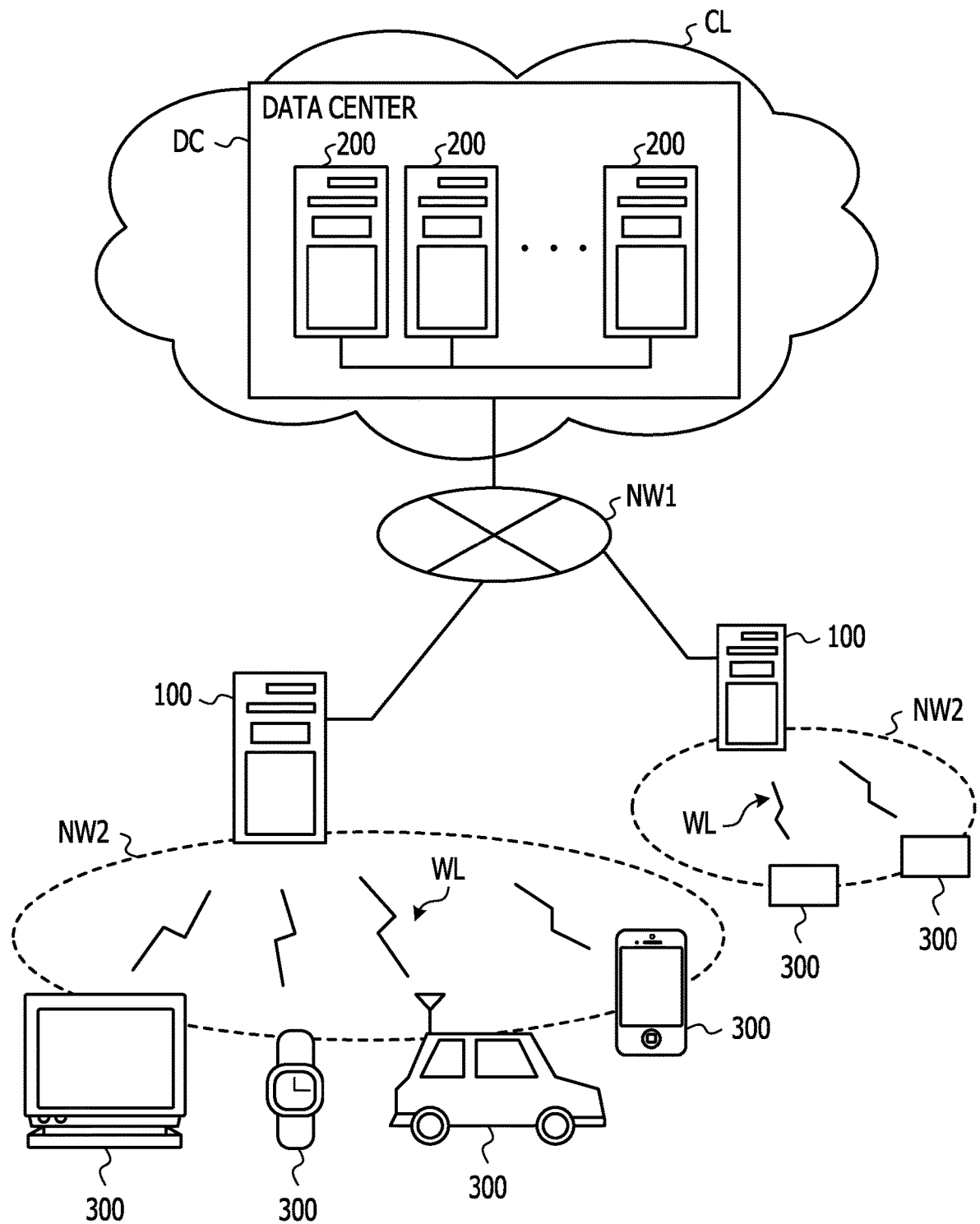
FIG. 1 is a diagram for describing an example of a distributed process management system.

FIG. 1 is a diagram for describing an example of a distributed process management system. A distributed process management system S illustrated in FIG. 1 includes edge servers 100 and a center server 200. The edge servers 100 and the center server 200 are coupled to each other by a communication network NW1. The communication network NW1 is, for example, the Internet.

The edge servers 100 may receive data sent from a variety of devices (for example, IoT devices) 300 used by end users via a communication network NW2. The devices 300 are mobile bodies such as automobiles, home electric appliances such as smart TVs, wearable terminals such as smart watches, smart terminals such as smartphones and tablet terminals, environmental sensors such as illuminance sensor and temperature sensors, and so on. The communication network NW2 is, for example, a wide area wireless communication network including long term evolution (LTE) network. The communication network NW2 is not limited to a wide area wireless communication network and may be a short-range wireless communication network such as wireless fidelity (Wi-Fi) (registered trademark) or Bluetooth (registered trademark) or a wired communication network for narrow band communication.

The edge servers 100 are provided closer to an end user side than the center server 200 as illustrated in FIG. 1. For example, the edge servers 100 are provided between the center server 200 and the devices 300. The edge servers 100 are information processing apparatuses such as IoT gateway products, mobile base stations, and access points. The edge servers 100 receive data sent from the devices 300 by using wireless communication WL. When data is received, the edge servers 100 start and execute processes that correspond to contents (for example, video or audio content or type thereof) of the data. For example, the edge servers 100 start and execute processes and process received data. Although details will be described later, the edge servers 100 according to the present embodiment send, to the center server 200, start notices including process start times and process amount of processing each time processes are started. However, the edge servers 100 according to the present embodiment do not send end notices including process end times to the center server 200 even when the processes end. Therefore, end notices are not sent in the present embodiment unlike a case in which both start notices and end notices are sent. The number of notices sent from the edge servers 100 into the communication network NW1 halves.

The center server 200 is an information processing apparatus provided at a data center DC or other facility on a cloud CL. The center server 200 receives start notices sent from the edge servers 100 and performs various types of information processing. For example, the center server 200 estimates and updates the process end times by using the process start times and the amount of processing included in the start notices and processing capabilities of the edge servers 100. Details of information processing performed by the center server 200 will be described later.

The edge servers 100 and the center server 200 described above will be described in detail below.

Figure 2:
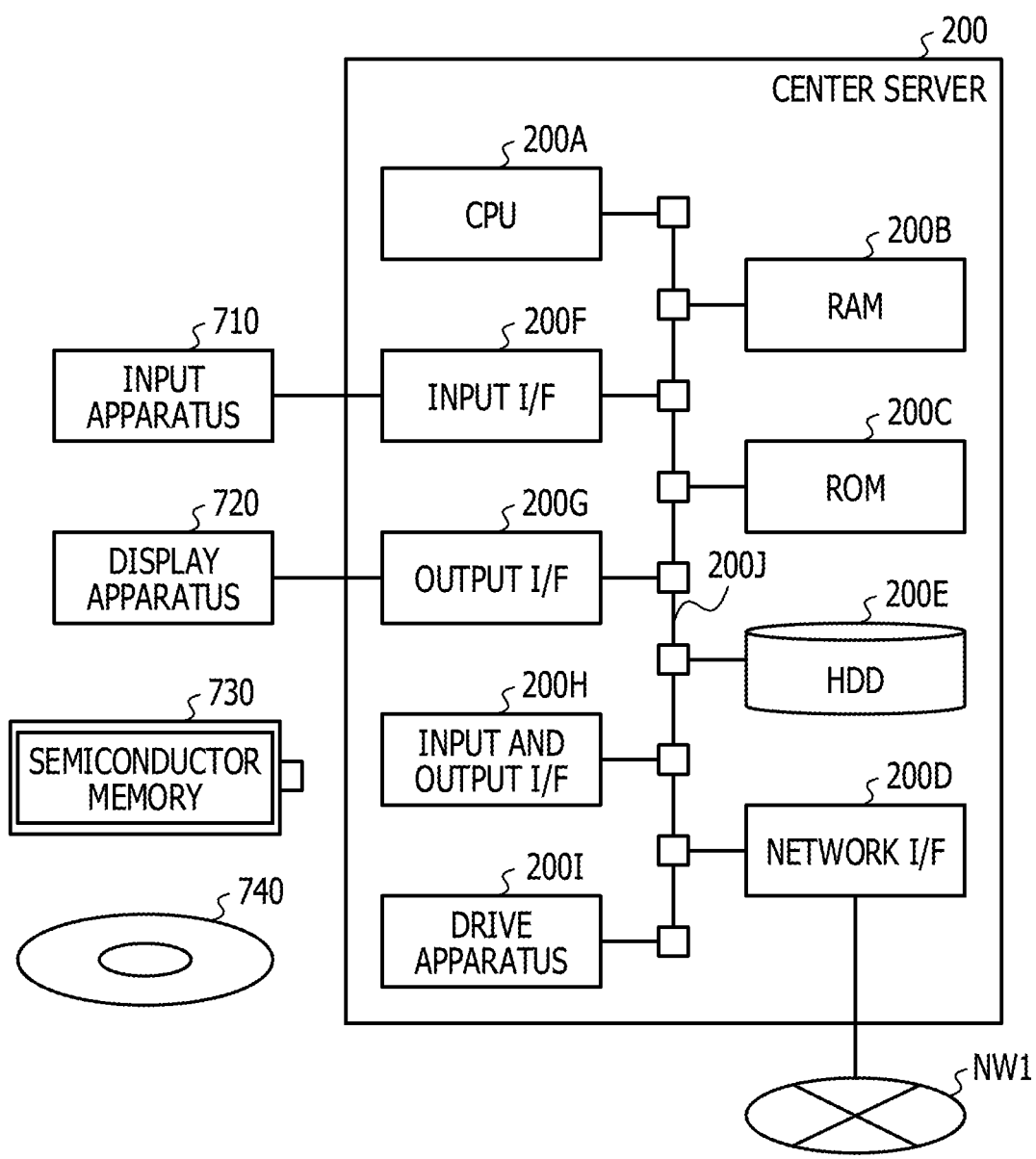
FIG. 2 is an example of a hardware configuration of a center server.

FIG. 2 is an example of a hardware configuration of a center server. The center server illustrated in FIG. 2 may be the center server 200 illustrated in FIG. 1. The description of the edge servers 100 described above will be omitted because the edge servers 100 basically have a similar hardware configuration to the center server 200. As illustrated in FIG. 2, the center server 200 includes at least a central processing unit (CPU) 200A as a hardware processor, a random access memory (RAM) 200B, a read only memory (ROM) 200C, and a network I/F (interface) 200D. The center server 200 may include, as may be necessary, at least one of a hard disk drive (HDD) 200E, an input I/F 200F, an output I/F 200G, an input/output I/F 200H, and a drive apparatus 200I. The CPU 200A through the drive apparatus 200I are coupled to each other by an internal bus 200J. A computer is realized at least by the CPU 200A and the RAM 200B working in a coordinated manner. A micro processing unit (MPU) may be used as a hardware processor in place of the CPU 200A.

An input apparatus 710 is coupled to the input I/F 200F. The input apparatus 710 is, for example, a keyboard or a mouse. A display apparatus 720 is coupled to the output I/F 200G. The display apparatus 720 is, for example, a liquid crystal display. A semiconductor memory 730 is coupled to the input/output I/F 200H. The semiconductor memory 730 is, for example, a universal serial bus (USB) memory or a flash memory. The input/output I/F 200H reads programs and data stored in the semiconductor memory 730. The input I/F 200F and the input/output I/F 200H include, for example, USB ports. The output I/F 200G includes, for example, a display port.

A portable recording medium 740 is inserted into the drive apparatus 200I. The portable recording medium 740 is a removable disc such as compact disc (CD)-ROM or digital versatile disc (DVD). The drive apparatus 200I reads programs and data recorded in the portable recording medium 740. The network I/F 200D includes, for example, a local area network (LAN) port. The network I/F 200D is coupled to the communication network NW1 described above.

The programs stored in the ROM 200C or the HDD 200E are placed into the RAM 200B described above by the CPU 200A. The programs recorded in the portable recording medium 740 are placed into the RAM 200B by the CPU 200A. By executing the programs that have been placed, the CPU 200A realizes a variety of functions described later and performs various types of processing described later. The programs may be appropriate to the flowcharts described later.

Functions of the edge servers 100 and the center server 200 will be described next with reference to FIG. 3 and FIG. 4A to FIG. 4D.

Figure 3:
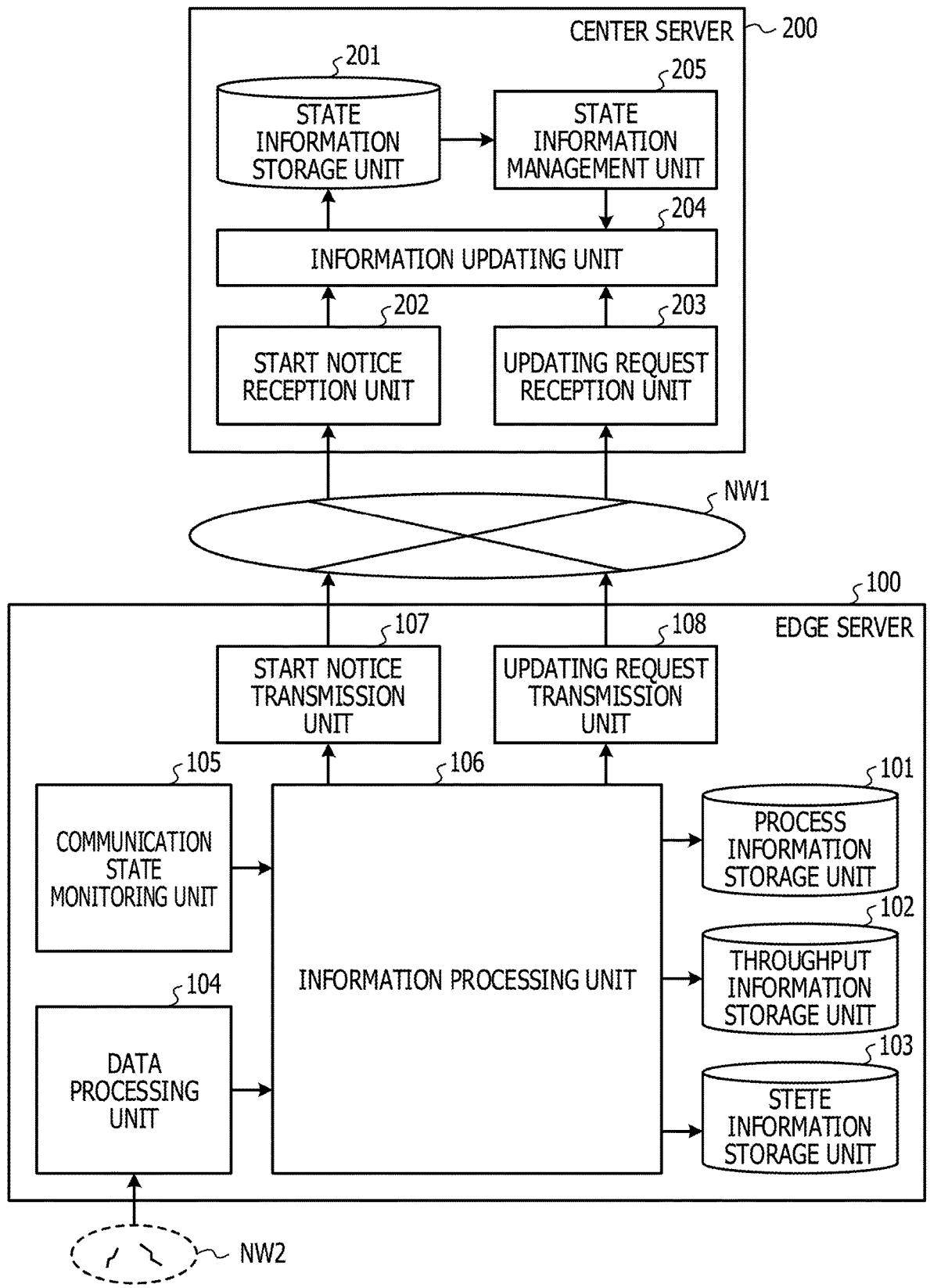
FIG. 3 is an example of a block diagram of an edge server and a center server.

FIG. 3 is an example of a block diagram of the edge server 100 and the center server 200. FIG. 4A is an example of a process information table T1. FIG. 4B is an example of the amount of processing information table T2. FIG. 4C is an example of a state information table T3. FIG. 4D is an example of a state information table T4.

The edge server 100 will be described first. The edge server 100 includes a process information storage unit 101, the amount of processing information storage unit 102, and a state information storage unit 103 as illustrated in FIG. 3. The edge server 100 includes a data processing unit 104, a communication state monitoring unit 105, and an information processing unit 106. Further, the edge server 100 includes a start notice transmission unit 107 and an updating request transmission unit 108. The process information storage unit 101, the amount of processing information storage unit 102, and the state information storage unit 103 may be realized, for example, by the HDD 200E described above. The data processing unit 104, the communication state monitoring unit 105, and the information processing unit 106 may be realized, for example, by the CPU 200A and the RAM 200B described above. The start notice transmission unit 107 and the updating request transmission unit 108 may be realized, for example, by the network I/F 200D described above.

The process information storage unit 101 stores process information related to processes started and executed by the data processing unit 104. As illustrated in FIG. 4A, process information is managed by the process information table T1. Process information includes a plurality of items such as process identification (ID), the amount of processing, and updated time. The process ID is identification information identifying a process. The amount of processing is the amount of work actually performed on received data by the process. The updated time represents the time when process information was updated.

The amount of processing described above may be expressed by the following formula (1):

$$\text{The amount of processing } W_{proc} = \Sigma_i C \cdot t_i / N_i \quad (1)$$

A variable C represents the processing capability of the edge server 100. For example, in the single edge server 100, it may be assumed that the variable C is substantially constant. Therefore, the amount of processing may be normalized for each edge server 100 by specifying a processing capability of "1" or a processing capability of "10" as the variable C. A variable t represents the processing time of the process. The processing time is the time it takes for processing and may be represented by the difference between the current time and the updated time. A variable N represents the current number of processes. A variable i represents the interval from the arrival of a process to the exit of the process. For example, therefore, in a case where the single edge server 100 with a processing capability of "10" processes two processes, the edge server 100 processes each process with a processing capability of "5," the quotient of the variable C by the variable N. The amount of processing may be calculated by multiplying the processing capability of "5" by the processing time. In the case of a processing capability of "1," the variable C may be omitted from the formula (1) described above.

The amount of processing information storage unit 102 stores a moving average of the amount of processing described above. As illustrated in FIG. 4B, the amount of processing information is managed by the amount of processing information table T2. The amount of processing information includes a plurality of items such as program ID and the amount of processing average. The program ID is identification information identifying a program. The process is a unit of execution of a program. On the other hand, the amount of processing average represents a moving average of the amount of processing.

The state information storage unit 103 stores first state information related to a state of a process started by the data processing unit 104. As illustrated in FIG. 4C, first state information is managed by the state information table T3. First state information includes a plurality of items such as process ID, process start time, and process end time. For example, the process start time and the process end time represent a time when a process is started and a time when the process ends, respectively.

When data sent from the device 300 is received via the communication network NW2, the data processing unit 104 processes the received data. For example, when data is received, the data processing unit 104 starts and executes a process that corresponds to contents of the data and manages the process while at the same time processing the data. For example, when a process is started, the data processing unit 104 notifies the information processing unit 106 of the start of a process together with the process ID. When the process ends, the data processing unit 104 notifies the information processing unit 106 of the end of the process together with the process ID. As a result, the information processing unit 106 may confirm the state of the process.

The communication state monitoring unit 105 monitors the state of communication between the edge server 100 and the center server 200 and notifies the information processing unit 106. For example, when communication between the edge server 100 and the center server 200 is interrupted, the communication state monitoring unit 105 notifies the information processing unit 106 of a first communication state indicating that communication is disabled. For example, when communication between the edge server 100 and the center server 200 is restored to normal after interruption, the communication state monitoring unit 105 notifies the information processing unit 106 of a second communication state indicating that communication is in progress. The communication state monitoring unit 105 may determine the state of communication between the edge server 100 and the center server 200, for example, by monitoring the start notice transmission unit 107.

The information processing unit 106 performs various types of processing based on the contents notified from the data processing unit 104 and the communication state notified from the communication state monitoring unit 105. For example, when notified of the start of a process from the data processing unit 104, and when notified of the second communication state from the communication state monitoring unit 105, the information processing unit 106 accesses the state information storage unit 103 and updates state information. For example, the information processing unit 106 registers the process ID and the process start time. In a case where a process end is notified, the information processing unit 106 registers the process end time appropriate to the process ID. In a case where the information processing unit 106 registers the process ID and the process start time, the information processing unit 106 calculates the amount of processing and the moving average of the amount of processing described above and registers the amount of processing and the moving average of the amount of processing respectively in the process information storage unit 101 and the amount of processing information storage unit 102. In a case where the calculated amount of processing is greater than a threshold of the amount of processing, the information processing unit 106 outputs a start notice including a process start time and a process amount of processing to the start notice transmission unit 107. In addition, the information processing unit 106 performs various types of information processing, and details thereof will be described later.

The start notice transmission unit 107 sends the start notice output from the information processing unit 106 to the center server 200. The updating request transmission unit 108 sends an updating request output from the information processing unit 106 to the center server 200. Although details will be described later, an updating request is information requesting updating of second state information managed by the center server 200. For example, in a case where communication between the edge server 100 and the center server 200 is interrupted, the start notice transmission unit 107 may not send a start notice to the center server 200. In this case, the information processing unit 106 outputs, to the updating request transmission unit 108, an updating request including a first state information list in which the process end time is registered as a process state list. The updating request transmission unit 108 sends such an updating request to the center server 200.

The center server 200 will be described next. As illustrated in FIG. 3, the center server 200 includes a state information storage unit 201, a start notice reception unit 202, an updating request reception unit 203, an information updating unit 204, and a state information management unit 205. The state information storage unit 201 may be realized, for example, by the HDD 200E described above. The start notice reception unit 202 and the updating request reception unit 203 may be realized, for example, by the network I/F 200D described above. The information updating unit 204 and the state information management unit 205 may be realized, for example, by the CPU 200A and the RAM 200B described above.

The state information storage unit 201 stores second state information related to the state of a process of each of the edge servers 100. Second state information is managed by the state information table T4 as illustrated in FIG. 4D. Second state information includes a plurality of items such as edge server ID, process ID, process start time, and estimated process end time. For example, edge server ID is identification information identifying each of the edge server 100. The estimated process end time is an estimated value of process end time calculated by the information updating unit 204 based on the process start time and the amount of processing included in the start notice and the processing capability of the edge server 100.

The start notice reception unit 202 receives a start notice sent from the edge server 100 and outputs the start notice to the information updating unit 204. The updating request reception unit 203 receives an updating request from the edge server 100 and outputs the updating request to the information updating unit 204. The information updating unit 204 updates the second state information stored in the state information storage unit 201 based on the start notice output from the start notice reception unit 202 or the updating request output from the updating request reception unit 203. For example, when a start notice is received, the information updating unit 204 calculates an estimated process end time and updates the second state information based on the process start time and the amount of processing included in the start notice and the processing capability of the edge server 100. For example, when an updating request is received, the information updating unit 204 updates the second state information stored in the state information storage unit 201 based on the first state information list included in the received updating request. As a result, the estimated process end time included in the second state information is rewritten to the process end time included in the first state information. For example, the estimated process end time is corrected to the actual process end time.

The state information management unit 205 monitors the second state information stored in the state information storage unit 201, and when second state information is detected whose estimated process end time has elapsed, the state information management unit 205 notifies the detected second state information to the information updating unit 204. For example, the state information management unit 205 notifies the process end to the information updating unit 204. As a result, the information updating unit 204 recalculates the estimated process end time and updates the second state information based on the process start time and the amount of processing that remain after the end of the process and the processing capability of the edge server 100.

The distributed process management system S will be described next.

Figure 5:
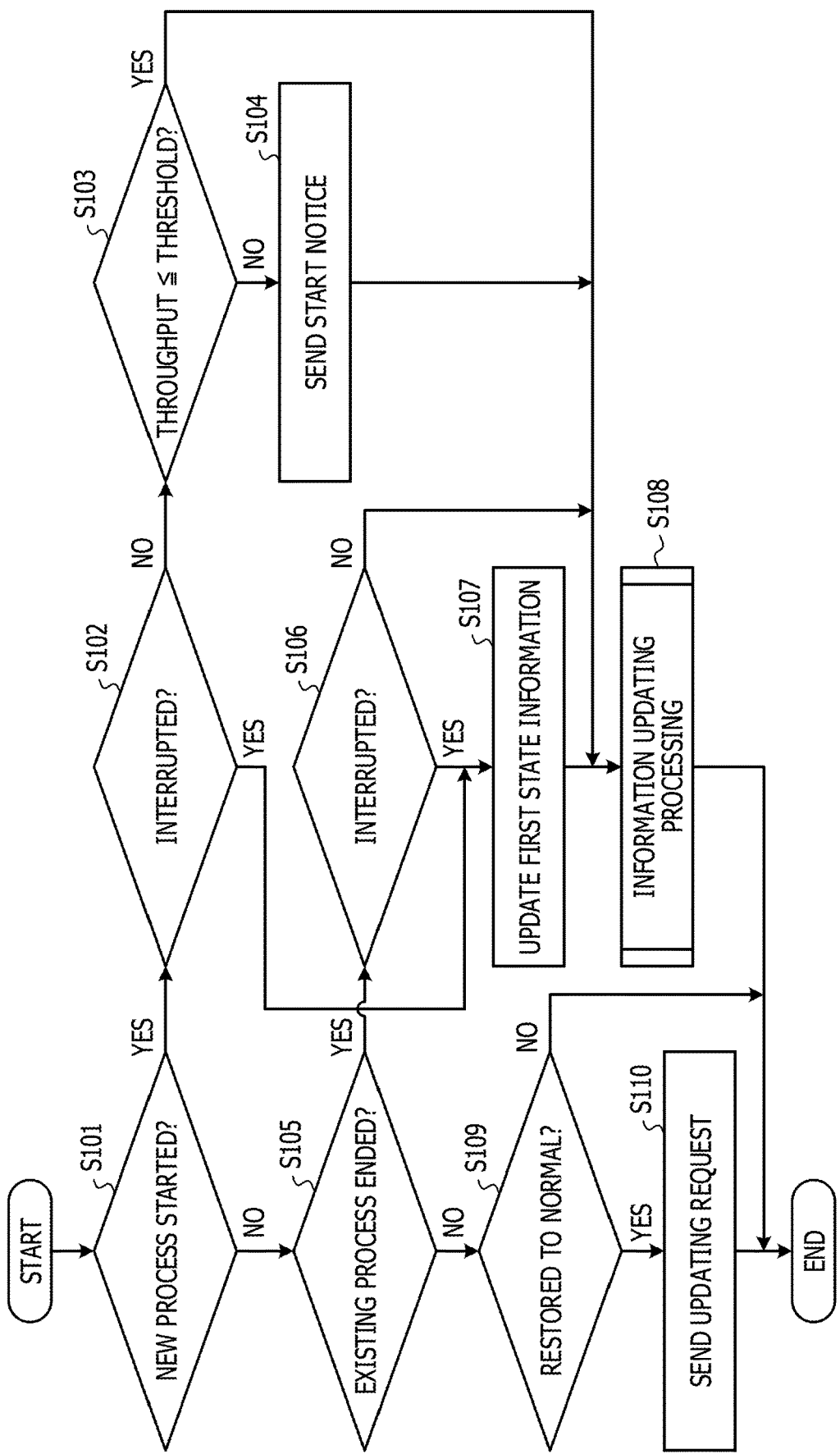
FIG. 5 is a flowchart illustrating an example of operation of an edge server.

Operation of the edge server 100 will be described first with reference to FIG. 5. FIG. 5 is a flowchart illustrating an example of operation of the edge server 100. First, the data processing unit 104 determines whether or not a new process has been started (S101). In a case where the data processing unit 104 determines that a new process has been started (YES in S101), next, the communication state monitoring unit 105 determines whether or not communication is interrupted (S102). In a case where the communication state monitoring unit 105 determines that communication is not interrupted (NO in S102), the information processing unit 106 determines whether or not the amount of processing is equal to or smaller than a threshold of the amount of processing (S103). For example, the information processing unit 106 calculates the amount of processing of the new process started and determines whether or not the calculated amount of processing is equal to or smaller than the threshold of the amount of processing.

In a case where the information processing unit 106 determines that the amount of processing is not equal to or smaller than the threshold of the amount of processing (NO in S103), the start notice transmission unit 107 sends a start notice (S104). For example, in a case where the information processing unit 106 determines that the amount of processing is greater than the threshold of the amount of processing, the start notice transmission unit 107 sends a start notice. On the other hand, in a case where the information processing unit 106 determines that the amount of processing is equal to or smaller than the threshold of the amount of processing (YES in S103), the information processing unit 106 skips the processing in S104. For example, in a case where the amount of processing is equal to or smaller than the threshold of the amount of processing, it is highly likely that the process will end in a short period of time, and there is not a good enough reason to send a start notice to the center server 200 and calculate an estimated process end time. As described above, in a case where the amount of processing is equal to or smaller than the threshold of the amount of processing, the number of messages between the edge servers 100 and the center server 200 may be reduced by not sending a start notice.

On the other hand, in a case where the data processing unit 104 determines that a new process has yet to be started (NO in S101) and that the existing process has ended (YES in S105), next, the communication state monitoring unit 105 determines whether or not communication is interrupted (S106). In a case where the communication state monitoring unit 105 determines that communication is interrupted (YES in S106), the information processing unit 106 updates the first state information (S107). In a state where the communication state monitoring unit 105 determines in the processing in S102 that communication is interrupted (YES in S102), the information processing unit 106 similarly performs the processing in S107. For example, in a state where communication between the edge server 100 and the center server 200 is interrupted, the start notice transmission unit 107 may not send a start notice. In this case, when a process that has been started and executed ends, the information processing unit 106 registers the end time of the process in the first state information and retains the first state information until communication is restored to normal.

In a case where the amount of processing is equal to or smaller than the threshold of the amount of processing in the processing in S103, in a case where the processing in S104 is performed, in a case where communication is not interrupted in the processing in S106, or in a case where the processing in S107 is performed, the information processing unit 106 performs information updating processing (S108). The information updating processing updates process information stored in the process information storage unit 101 and the amount of processing information stored in the amount of processing information storage unit 102. Details of the information updating processing will be described later.

On the other hand, in a case where the data processing unit 104 has yet to end the existing process (NO in S105), the communication state monitoring unit 105 determines whether or not communication has been restored to normal (S109). In a case where the communication state monitoring unit 105 determines that communication has been restored to normal (YES in S109), the updating request transmission unit 108 sends an updating request (S110). For example, in a case where although a new process has been started, the process has yet to end, and in a case where communication has been restored to normal after interruption, the information processing unit 106 acquires first state information and creates a list from the first state information, includes the list of the first state information in an updating request, and sends the updating request to the updating request transmission unit 108. As a result, the updating request transmission unit 108 sends the updating request including the first state information list to the center server 200. In a case where the processing in S110 is complete, or in a case where the communication state monitoring unit 105 determines that communication has yet to be restored to normal (NO in S109), the edge server 100 ends its processing. The edge server 100 periodically repeats the processing.

The information updating processing described above will be described next with reference to FIG. 6.

Figure 6:
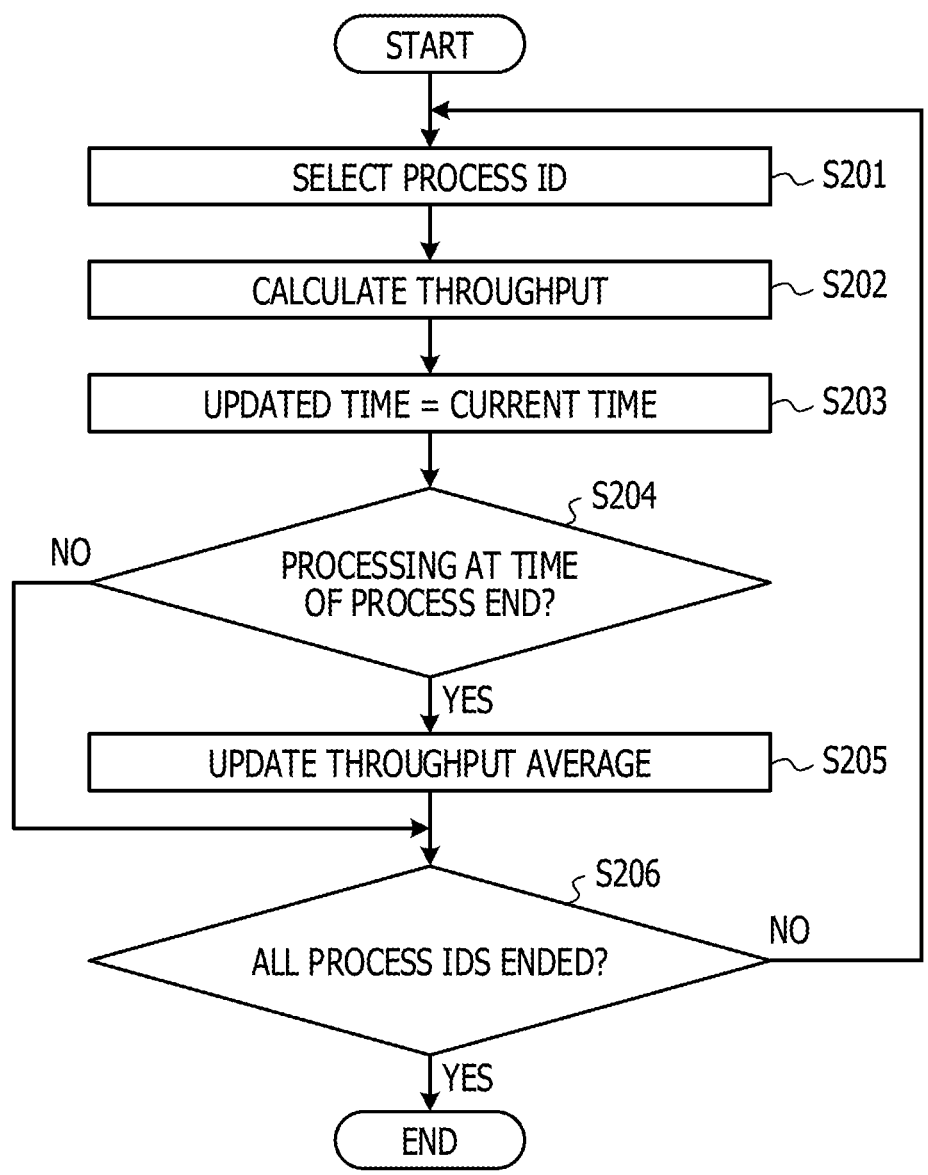
FIG. 6 is a flowchart illustrating an example of information updating processing.

FIG. 6 is a flowchart illustrating an example of information updating processing. As described above, when the processing in S104, S107 or the like is complete, the information processing unit 106 selects a process ID (S201). For example, the information processing unit 106 accesses the process information storage unit 101 and selects a process ID from among those in the process information managed by the process information table T1. When the processing in S201 is complete, next, the information processing unit 106 calculates the amount of processing of the process identified by the selected process ID (S202). For example, the information processing unit 106 calculates the amount of processing using the formula (1) described above and registers the amount of processing in process information.

When the processing in S202 is complete, next, the information processing unit 106 registers the current time as updated time (S203). For example, the information processing unit 106 registers the current time as updated time of process information identified by the selected process ID. When the processing in S203 is complete, next, the information processing unit 106 determines whether or not the information updating processing is processing at the time of the process end (S204). In a case where the information processing unit 106 determines that the information updating processing is processing at the time of the process end (YES in S204), the information processing unit 106 deletes an entry and updates the amount of processing average (S205). On the other hand, in a case where the information processing unit 106 determines that the information updating processing is not processing at the time of the process end (NO in S204), the information processing unit 106 skips the processing in S205.

In a case where the processing in S205 is complete, or in a case where the processing in S205 is skipped, the information processing unit 106 determines whether or not all the process IDs have been ended (S206). For example, the information processing unit 106 determines whether or not there are any process IDs that have yet to be selected. In a case where the information processing unit 106 determines that not all the process IDs have been ended (NO in S206), the information processing unit 106 performs the processing in S201 again. On the other hand, in a case where the information processing unit 106 determines that all the process IDs have been ended (YES in S206), the information processing unit 106 ends the information updating processing.

Figure 7:
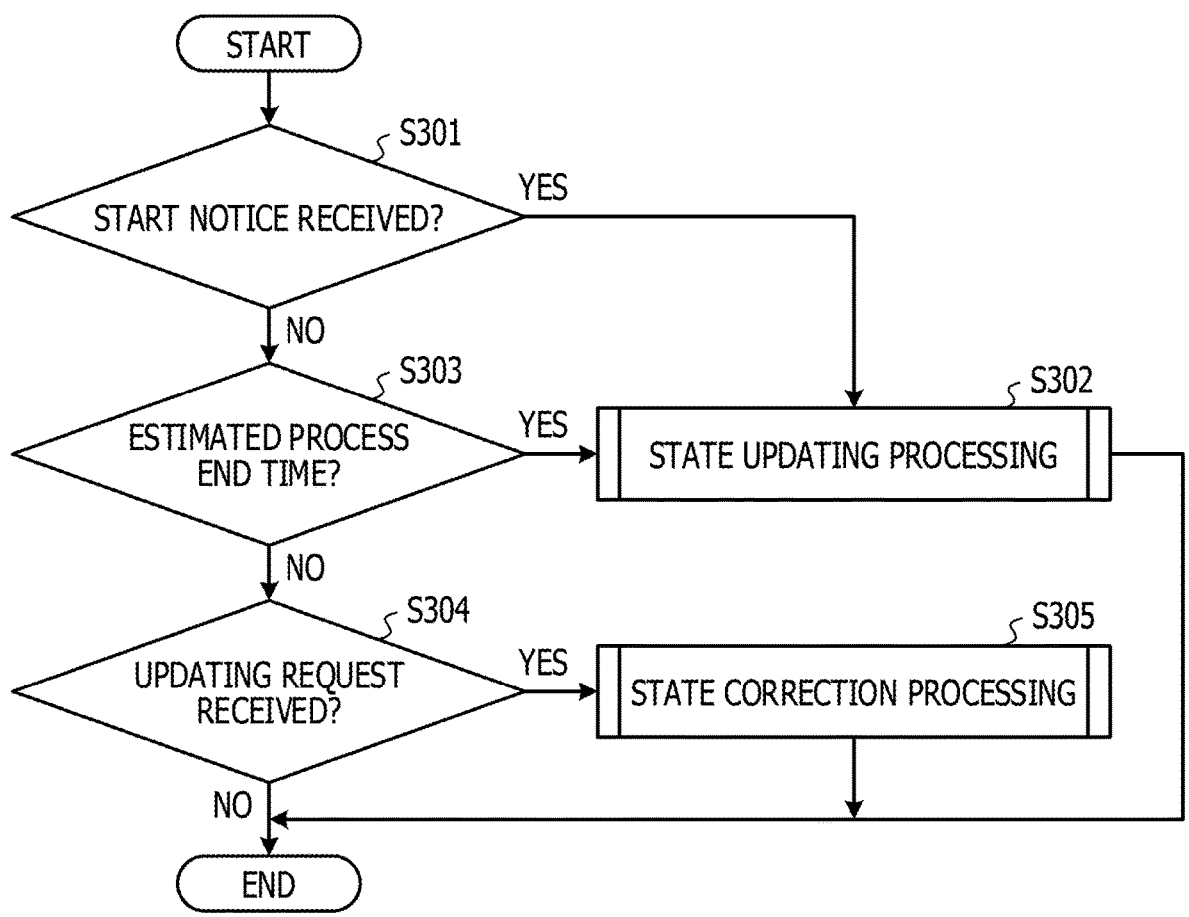
FIG. 7 is a flowchart illustrating an example of operation of a center server.

Next, the operation of the center server 200 will be described with reference to FIG. 7. FIG. 7 is a flowchart illustrating an example of operation of the center server 200. First, the start notice reception unit 202 determines whether or not a start notice has been received (S301). In a case where the start notice reception unit 202 determines that a start notice has been received (YES in S301), the information updating unit 204 performs state updating processing (S302). The state updating processing updates second state information stored in the state information storage unit 201. Details of the state updating processing will be described later. When the information updating unit 204 ends the state updating processing, the center server 200 ends its operation.

On the other hand, in a case where the start notice reception unit 202 determines that a start notice has yet to be received (NO in S301), next, the state information management unit 205 determines whether or not the estimated process end time has elapsed (S303). For example, the state information management unit 205 periodically accesses the state information storage unit 201 and determines whether or not there is second state information whose estimated process end time has elapsed. In a case where the state information management unit 205 determines that the estimated process end time has elapsed (YES in S303), the information updating unit 204 performs the processing in S302. When the information updating unit 204 finishes the state updating processing, the center server 200 ends its operation.

On the other hand, in a case where the state information management unit 205 determines that the estimated process end time has yet to elapse (NO in S303), the updating request reception unit 203 determines whether or not an updating request has been received (S304). In a case where the updating request reception unit 203 determines that an updating request has been received (YES in S304), the information updating unit 204 performs state correction processing (S305). The state correction processing corrects second state information stored in the state information storage unit 201. Details of the state correction processing will be described later. When the information updating unit 204 finishes the state correction processing, the center server 200 ends its operation. In a case where the updating request reception unit 203 determines that an updating request has yet to be received (NO in S304), the center server 200 similarly ends its operation.

The state updating processing described above will be described next with reference to FIG. 8.

Figure 8:
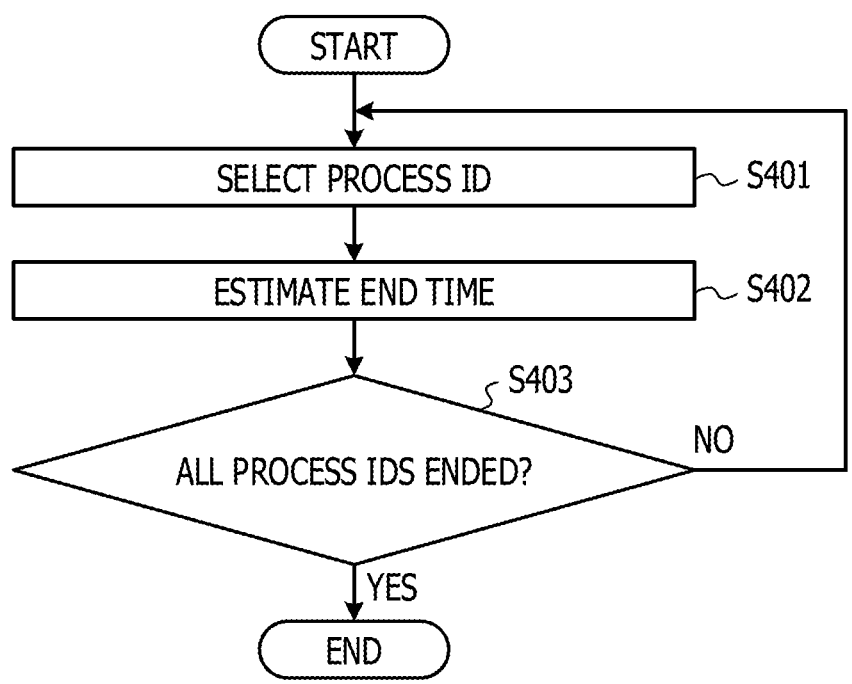
FIG. 8 is a flowchart illustrating an example of state updating processing.

FIG. 8 is a flowchart illustrating an example of state updating processing. As described above, in a case where the start notice reception unit 202 determines that a start notice has been received in the processing in S301, or in a case where the state information management unit 205 determines that the estimated process end time has elapsed in the processing in S303, the information updating unit 204 selects a process ID (S401). For example, the information updating unit 204 identifies the edge server 100 that sent a start notice based on the start notice output from the start notice reception unit 202 and selects a process ID from among those in the second state information in the identified edge server 100.

When the processing in S401 is complete, next, the information updating unit 204 estimates the end time of the process identified by the selected process ID (S402). In a case where the processing in S402 is complete, the information updating unit 204 determines whether or not all the process IDs have been ended (S403). For example, the information updating unit 204 determines whether or not there are any process IDs that have yet to be selected. In a case where the information updating unit 204 determines that not all the process IDs have been ended (NO in S403), the information updating unit 204 performs the processing in S401 again. On the other hand, in a case where the information updating unit 204 determines that all the process IDs have been ended (YES in S403), the information updating unit 204 ends the state updating processing.

The estimation of process end time described above will be described further in detail with reference to FIG. 9.

FIGS. 9A, 9B, and 9C are diagrams for describing estimation of process end time. First, as illustrated in FIG. 9A, in a case where the information updating unit 204 receives a start notice including a "150" the amount of processing for a process A at time "0" from the start notice reception unit 202, and assuming that the processing capability of the edge server 100 that sent the start notice is "10," the information updating unit 204 estimates the end time of the process A to be "15" (=the amount of processing/processing capability) because the "150" the amount of processing of the single process A is processed by the "10" processing capability. For example, in a case where the current time is set as the start time, the information updating unit 204 estimates that the process A will exit in time "15" from the current time. The unit of time is not limited, and may be, for example, hours, minutes, or seconds.

Next, in a case where a start notice including a "200" the amount of processing for a process B is received from the start notice reception unit 202 at the current time that is time "5" past time "0" when the process A arrived as illustrated in FIG. 9B, the information updating unit 204 calculates the remaining amount of processing of the process A first. For example, because all the "10" processing capability is used to process the single process A and because the elapsed time until the current time is "5" (=time "5"–time "0"), the information updating unit 204 calculates the amount of processing resulting from processing from time "0" to time "5" to be "50" (=(processing capability/number of processes until the current time)*(current time–start time of the process A)). Therefore, the information updating unit 204 calculates the remaining amount of processing of the process A to be "100" (="150" the amount of processing–"50" the amount of processing).

On the other hand, because of the arrival of the process B, the edge server 100 uses all its "10" processing capability to process the two processes A and B in the processing from time "5" and beyond. The edge server 100 processes the process A and the process B individually with the "5" processing capability (=processing capability/new number of processes). Therefore, because the remaining "100" the amount of processing of the process A is processed with the "5" processing capability, the information updating unit 204 calculates the processing time to be "20" (the amount of processing/processing capability). Because the current time is "5," the information updating unit 204 estimates a new end time of the process A to be "25" (=current time+processing time). Thus, the information updating unit 204 updates "15," the end time of the process A, to "25," a new end time, and registers the information in the state information storage unit 201 (for example, estimated process end time).

Because the process B has yet to be processed and because the remaining "200" the amount of processing of the process B is processed with the "5" processing capabil-ity, the information updating unit 204 calculates the processing time to be "40" (=the amount of processing/processing capability). Because the current time is "5," the information updating unit 204 estimates the end time of the process B to be "45" (=current time+processing time). The information updating unit 204 registers information about "45," the exit time of the process B, in the state information storage unit 201 (for example, estimated process end time).

Next, as illustrated in FIG. 9C, when the current time passes "25," the end time of the process A, the process A ends and exits. The edge server 100 uses the "5" processing capability to process the two processes A and B in the processing before time "25." Because the elapsed time from the start time of the process B to the current time is "20" (=time "25"–time "5"), the information updating unit 204 calculates the amount of processing resulting from processing from time "5" to time "25" to be "100" (=(processing capability/number of processes until the current time)*(current time–start time of the process B)). The information updating unit 204 calculates the remaining amount of processing of the process B to be "100" (="200" the amount of processing–"100" the amount of processing).

On the other hand, as a result of the exit of the process A, the edge server 100 uses all its "10" processing capability to process the single process B in the processing from time "25" and beyond. The edge server 100 processes the process B with the "10" processing capability (=processing capability/new number of processes). Therefore, because the remaining "100" the amount of processing of the process B is processed with the "10" processing capability, the information updating unit 204 calculates the processing time to be "10" (the amount of processing/processing capability). Because the current time is "25," the information updating unit 204 estimates the new end time of the process B to be "35" (=current time+processing time). The information updating unit 204 updates "45," the end time of the process B, to "35," a new end time, and registers the information in the state information storage unit 201 (for example, estimated process end time).

The state correction processing described above will be described next with reference to FIG. 10.

FIG. 10 is a flowchart illustrating an example of state correction processing. As described above, in a case where the updating request reception unit 203 determines that an updating request has been received in the processing in S304, the information updating unit 204 sorts the process state list (S501). For example, the information updating unit 204 acquires the list of the first state information (refer to FIG. 4C) from the updating request output from the updating request reception unit 203 and rearranges the process IDs in the acquired list in the order of the process start time. When the processing in S501 is complete, next, the information updating unit 204 selects one process after the other from the list (S502).

When the processing in S502 is complete, next, the information updating unit 204 selects a process ID from second state information (S503). For example, the information updating unit 204 identifies, based on an updating request, the edge server 100 that sent the updating request and selects one of process IDs from among those in the second state information (refer to FIG. 4D) in the identified edge server 100.

When the processing in S503 is complete, next, the information updating unit 204 updates the estimated process end time (S504). For example, the information updating unit 204 updates the estimated process end time included in the second state information identified by the selected process ID to the process end time included in the first state information. As a result, the estimated process end time included in the second state information is corrected to the time when the process actually ended.

When the processing in S504 is complete, next, the information updating unit 204 determines whether or not all the process IDs included in the second state information have been ended (S505). For example, the information updating unit 204 determines whether or not there are any process IDs that have yet to be selected in the second state information. In a case where the information updating unit 204 determines that not all the process IDs included in the second state information have been ended (NO in S505), the information updating unit 204 performs the processing in S503 again.

On the other hand, in a case where the information updating unit 204 determines that all the process IDs included in the second state information have been ended (YES in S505), next, the information updating unit 204 determines whether or not all the process IDs included in the first state information list have been ended (S506). For example, the information updating unit 204 determines whether or not there are any process IDs that have yet to be selected in the first state information. In a case where the information updating unit 204 determines that not all the process IDs included in the first state information list have been ended (NO in S506), the information updating unit 204 performs the processing in S502 again. On the other hand, in a case where the information updating unit 204 determines that all the process IDs included in the first state information list have been ended (YES in S506), the information updating unit 204 ends the state correction processing.

As described above, the distributed process management system S according to the present embodiment includes the edge server 100 and the center server 200. The edge server 100 starts and executes a process corresponding to contents of data in a case where the data sent from the device 300 is received. The center server 200 manages a state of the process. For example, each time a process is started, the edge server 100 sends, to the center server 200, a start notice including a process start time and its amount of processing. On the other hand, each time a start notice including a process start time and its amount of processing is sent, the center server 200 estimates a process end time based on the start time and the amount of processing and updates the process end time.

As a result, the increase in number of messages between the edge server 100 and the center server 200 may be suppressed. For example, even in a case where only a few computer resources are available with the edge server 100, the edge server 100 takes charge of low load processing such as calculation of the amount of processing and a moving average of the amount of processing, and the center server 200 takes charge of heavy load processing such as estimation of process end time. The edge server 100 may sufficiently perform low load processing. Even in a case where the communication network NW1 is unstable, the state of the process executed by the edge server 100 when the communication network NW1 stabilizes is sent. Therefore, the center server 200 may maintain process management.

As illustrated in FIG. 11, the amount of processing X in excess of the threshold of the amount of processing is included in a start notice and sent. However, four amount of processing Y1, Y2, Y3, and Y4 equal to or smaller than the threshold of the amount of processing are not included in a start notice and are not sent. Assuming that the amount of processing X and the amount of processing Y1, Y2, Y3, and Y4 are sent from the edge server 100 to the center server 200 each time, five start notices take place and are sent. However, according to the present embodiment, although a start notice is sent in a case where a process is started, no notice is sent in a case where the process ends. For example, the number of notices sent from the edge server 100 to the center server 200 is halved. As a whole, the number of messages sent from the edge server 100 to the center server 200 is reduced one tenth.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it may be understood that the various changes, substitutions, and alterations could be made hereto without departing from the spirit and scope of the invention. For example, priority may be assigned to processes when the processes are processed. Assuming that the amount of processing of the process A is set as "10" and the processing priority is set as "2," the information processing unit 106 calculates the processing time to be "20" (=the amount of processing×priority). Similarly, in a case where the amount of processing of the process B is set as "10" and the processing priority is set as "1," the information processing unit 106 calculates the processing time to be "10." These processing times calculated by the information processing unit 106 are applicable to the formula (1) described above. Therefore, even in a case where processing priority is considered, the invention may be realized by using the embodiment described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A distributed process management system comprising:
    an edge server configured to start and execute a process corresponding to contents of data when the data sent from a device is received; and
    a center server configured to manage state information in which the process, a start time of the process and an end time of the process are associated with each other for each of a plurality of processes,
    wherein the edge server is configured to notify the center server of the start time of the process and an amount of processing of the process, each time the process is started, and
    the center server is configured to:
        estimate the end time of the process to be executed by the edge server based on the start time, the amount of processing and a processing capability of the edge server, each time the start time and the amount of processing are notified, and update the state information by using the estimated end time of the process,
wherein the center server is configured to:
calculate a processing time by dividing the amount of processing by the processing capability, and
calculate the end time of the process by adding the processing time to the start time.

2. The distributed process management system according to claim 1,
wherein the edge server is configured to notify the start time and the amount of processing of the process when the amount of processing is greater than a threshold of the amount of processing.

3. The distributed process management system according to claim 1, wherein
the edge server is configured to:
retain an end time of the process when communication with the center server is interrupted, and
send the retained end time of the process to the center server when communication with the center server is recovered, and
the center server is configured to change the estimated end time of the process to the retained end time of the process.

4. The distributed process management system according to claim 1,
wherein the edge server is configured to suppress notification to the center server of the process end time when the process ends.

5. The distributed process management system according to claim 1,
wherein the edge server is provided between the center server and the device.

6. The distributed process management system according to claim 1,
wherein the contents of data include video content, audio content or type of the contents.

7. An information processing apparatus comprising:
a memory; and
a processor coupled to the memory and configured to:
start and execute a process corresponding to contents of data when the data sent from a device is received, and
notify a start time of the process and an amount of processing of the process, each time the process is started to a center server,
wherein the center server manages state information in which the process, the start time of the process and an end time of the process are associated with each other for each of a plurality of processes, estimates the end time of the process to be executed by the information processing apparatus based on the start time, the amount of processing and a processing capability of the information processing apparatus, each time the start time and the amount of processing are notified, and updates the state information by using the estimated end time of the process,
wherein the center server is configured to:
calculate a processing time by dividing the amount of processing by the processing capability, and
calculate the end time of the process by adding the processing time to the start time.

8. An information processing apparatus configured to communicate with an edge server, the edge server starting and executing a process corresponding to contents of data when the data sent from a device is received and notifying a start time of the process and an amount of processing of the process, each time the process is started, the information processing apparatus comprising:
a memory; and
a processor coupled to the memory and configured to:
manage state information in which the process, the start time of the process and an end time of the process are associated with each other for each of a plurality of processes, and
estimate the end time of the process to be executed by the edge server based on the start time, the amount of processing and a processing capability of the edge server, each time the start time and the amount of processing are notified by the edge server, and
update the state information by using the estimated end time of the process,
wherein the processor is configured to:
calculate a processing time by dividing the amount of processing by the processing capability, and
calculate the end time of the process by adding the processing time to the start time.

9. A distributed process management method comprising:
starting and executing, by a first computer, a process corresponding to contents of data when the data sent from a device is received;
notifying a start time of the process and an amount of processing of the process, each time the process is started;
managing, by a second computer, state information in which the process, the start time of the process and an end time of the process are associated with each other for each of a plurality of processes;
estimating the end time of the process to be executed by the first computer based on the start time, the amount of processing and a processing capability of the first computer, each time the start time and the amount of processing are notified by the first computer, and
updating the state information by using the estimated end time of the process,
wherein the estimating the end time includes:
calculating a processing time by dividing the amount of processing by the processing capability, and
calculating the end time of the process by adding the processing time to the start time.

10. The distributed process management method according to claim 9, further comprising
notifying the start time and the amount of processing of the process when the amount of processing is greater than a threshold of the amount of processing.

11. The distributed process management method according to claim 9, further comprising:
retaining, by the first computer, an end time of the process when communication with the second computer is interrupted,
sending, by the first computer, the retained end time of the process to the second computer when communication with the second computer is recovered, and
changing, by the second computer, the estimated end time of the process to the retained end time of the process.

12. The distributed process management method according to claim 9, further comprising
suppressing notification to the second computer of the process end time when the process ends.

* * * * *